J. P. HEDSTROM.
COMBINED REST AND CLAMP.
APPLICATION FILED MAR. 24, 1911.
1,031,712.
Patented July 9, 1912.
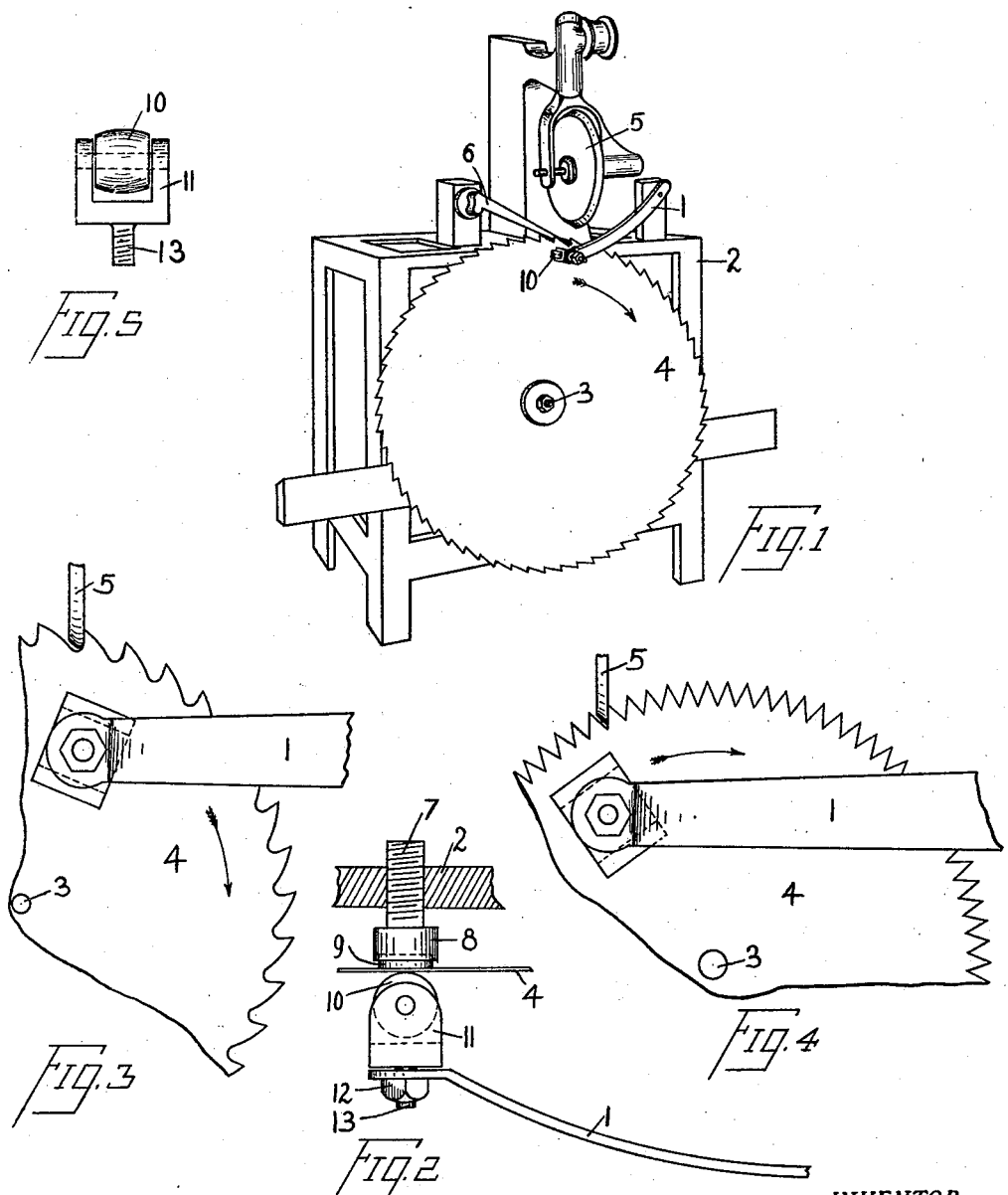

UNITED STATES PATENT OFFICE.

JOHN PATRICK HEDSTROM, OF BIG RAPIDS, MICHIGAN, ASSIGNOR TO HANCHETT SWAGE WORKS, OF BIG RAPIDS, MICHIGAN, A CORPORATION OF MICHIGAN.

COMBINED REST AND CLAMP.

1,031,712.  Specification of Letters Patent.  Patented July 9, 1912.

Application filed March 24, 1911. Serial No. 616,681.

*To all whom it may concern:*

Be it known that I, JOHN P. HEDSTROM, a citizen of the United States, residing at Big Rapids, in the county of Mecosta and State of Michigan, have invented certain new and useful Improvements in Combined Rests and Clamps; and I do hereby declare the following to be a full, clear, and exact description of the invention, such as will enable others skilled in the art to which it appertains to make and use the same.

This invention is a combined saw rest and clamp adapted for use with automatic circular saw sharpening machines.

The objects of the invention are to provide a device that will firmly clamp the saw on its two sides at a point near the periphery of the saw disk and close to the point of application of the emery wheel.

The improvement consists more particularly in the construction and arrangement of parts of the clamping device whereby the saw disk is firmly clamped against both lateral or sidewise movement and against movement of rotation while the emery wheel is operating on the teeth.

In machines of this type it has heretofore been customary to provide a clamping device operating by frictional contact against the opposite sides of the disk. In this device a metal block has usually been provided on the frame of the machine, against which block one side of the saw disk bears, and on the opposite side of the disk has been provided a leather pad or washer spring-pressed against the outer face of the disk to force the disk against the block, both the block and pad being located near the periphery of the saw disk. The pad has been usually mounted on a long spring arm secured at one end to the frame of the machine at a considerable distance from the point of application of the pad.

It has been found in practice that this arrangement is unsatisfactory in operation for the reason that the spring-pressed pad must bear with considerable force against the side of the saw disk in order to hold the saw sufficiently tight against the block to prevent sidewise vibration of the saw. When the pad is made to bear with sufficient force against the side of the saw to accomplish the result just mentioned, it also exerts strong frictional contact with the saw disk, so that after a tooth has been sharpened and the saw is fed around by the mechanism of the sharpening machine so as to bring the next tooth under the emery wheel, the friction between the pad and saw is sufficient to bow the long pad spring outwardly and to move the pad around with the saw a short distance. When the saw has been fed to the position as above described and the feed finger of the automatic sharpening machine has been drawn back, the long pad spring, which has been bowed out, resumes its normal position, thereby moving the pad back a short distance, the frictional contact between the pad and the saw being sufficient to move the saw backward a fraction of an inch so that the next tooth to be sharpened is not correctly located with reference to the emery wheel and a more or less incorrect shape is given to the tooth. In other words, as the feed finger is pushing the saw, say to the right, the spring will sometimes give a little, owing to the friction of the leather pad against the saw disk and then when the feed finger ceases to push against the saw and is on the backward movement, the spring will straighten back to its original position and move the saw back with it a fraction of an inch.

The object of my improvement, therefore, is to avoid all sliding friction between the end of the spring and the saw disk and yet allow the spring to exert sufficient lateral pressure on the disk to hold the saw firmly in place, it being necessary to clamp the saw quite tightly to prevent any movement.

With these and certain other objects in view, which will appear in detail in the specification, my improvement consists in the devices described and pointed out in the claims.

In the drawings, Figure 1 shows my improvement applied to an automatic saw sharpening machine; Fig. 2 is a top plan view showing the end of the spring and the friction pad in contact with the saw disk; Fig. 3 shows the device adapted to the sharpening of a rip saw; Fig. 4 shows it applied to a cross-cut saw; and Fig. 5 is a detail of the roller carried by the end of the spring.

As is clearly shown in the drawings, the device consists in the usual spring arm 1 carried by the frame 2 of an automatic saw sharpening machine, on the arbor 3 of which is mounted the saw 4 to be sharpened, the saw being fed into consecutive positions under the emery wheel by means of the usual feed finger 6. On the frame 2 of the machine and at a point approximately in alinement with the emery wheel 5 I mount a threaded bolt 7 having a cupped end 8 carrying a friction pad 9 of leather or other suitable material, as shown in Fig. 2. The bolt 7 is adjustable toward or from the saw disk 4 by screwing it in or out.

Directly opposite the pad 9 and pressing against the outer face of the saw disk 4 is a roller 10 revolubly mounted in a bracket 11 which is carried by the free end of the spring 1. The bracket is clamped to the spring 1 by means of a nut 12 threaded on the shank 13 of the bracket 11. The bracket 11 and roller 10 may be angularly adjusted to bring the axis of the roller 10 approximately radial with reference to the saw disk, to allow the roller to run freely as the saw is fed around by the feed finger 6.

It will be noted that while the roller 10 exerts the full pressure of spring 1 against the saw disk 4 to hold it against the friction pad 9, yet the roller 10 offers little or no resistance to the forward movement of the saw 4 and consequently has no tendency to bow the spring 1 outward, thereby avoiding the difficulties previously mentioned. The friction pad 9 being immovable prevents the feed finger 6 from moving the disk 4 too far ahead and also prevents the disk from slipping either to the right or left when released by the feed finger.

By the means above described I have produced a simple, yet effective clamping device that permits each tooth of the saw to assume its proper position with relation to the emery wheel and holds the saw firmly in that position while the emery wheel is operating on it, thereby producing work of extreme accuracy and uniformity.

Having described my invention, what I claim and desire to secure by Letters Patent, is:—

1. In combination with a saw sharpening machine, a clamping device comprising a spring arm fixed at one end to the frame of the machine, a revoluble roller carried by the free end of said spring and adapted to bear against the side of the saw being sharpened, together with a friction pad adjustably mounted on the frame of the machine and adapted to bear against the saw disk at a point opposite the point of application of the roller.

2. In combination with a saw sharpening machine, a clamping device comprising a spring arm fixed at one end to the frame of the machine, a bracket, a roller revolubly mounted in said bracket, the bracket being swiveled to the free end of said spring, together with a friction pad adjustably mounted on the frame of the machine and adapted to bear against the saw disk at a point opposite the point of application of the roller.

3. In combination with a saw sharpening machine, a clamping device comprising a spring arm fixed at one end to the frame of the machine, a revoluble roller carrier by the free end of said spring and adapted to bear against the side of the saw being sharpened, together with a bolt threaded in the frame of the machine, said bolt having a cupped head, a friction pad mounted therein, said pad adapted to bear against the saw disk at a point opposite the point of application of the roller.

4. In combination with a saw sharpening machine, a clamping device comprising a spring arm fixed at one end to the frame of the machine, a revoluble roller carrier by the free end of said spring arm and adapted to bear against the side of the saw being sharpened, together with supporting means mounted on the frame of the machine and adapted to bear with frictional contact against the saw disk at a point opposite the point of application of the roller, to normally hold the disk immovable.

In testimony whereof, I affix my signature in presence of two witnesses.

JOHN PATRICK HEDSTROM.

Witnesses:
 VOLNEY H. HANCHETT,
 H. J. HEYDENBURG.

---

Copies of this patent may be obtained for five cents each, by addressing the "Commissioner of Patents, Washington, D. C."